US010672132B2

(12) United States Patent
Azanza et al.

(10) Patent No.: US 10,672,132 B2
(45) Date of Patent: Jun. 2, 2020

(54) POST PROCESSING TO IMPROVE MOTION DETECTION RESULTS

(71) Applicant: Oracle International Corporation, Redwood Shores, CA (US)

(72) Inventors: Jose Luis Mendoza Azanza, Zapopan (MX); Susan Mavris, Bedford, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/147,643

(22) Filed: Sep. 29, 2018

(65) Prior Publication Data

US 2019/0102889 A1 Apr. 4, 2019

Related U.S. Application Data

(60) Provisional application No. 62/566,063, filed on Sep. 29, 2017.

(51) Int. Cl.
*G06T 7/20* (2017.01)
*G06K 9/00* (2006.01)
(Continued)

(52) U.S. Cl.
CPC ............ *G06T 7/20* (2013.01); *G06K 9/00744* (2013.01); *G06T 7/194* (2017.01); *G06T 7/254* (2017.01);
(Continued)

(58) Field of Classification Search
None
See application file for complete search history.

(56) References Cited

U.S. PATENT DOCUMENTS 8,160,390 B1   4/2012  Sandrew et al.
8,315,466 B2  11/2012  El-Maleh et al.
(Continued)

FOREIGN PATENT DOCUMENTS

WO  WO 2007/044672 A2  4/2007
WO  WO 2014/102568 A1  7/2014

OTHER PUBLICATIONS

Zhang et al., "Live Video Analytics at Scale with Approximation and Delay-Tolerance", Proceedings of the 14th USENIX Symposium on Networked Systems Design and Implementation, dated Mar. 2017, 17 pages.

(Continued)

*Primary Examiner* — Edemio Navas, Jr.
(74) *Attorney, Agent, or Firm* — Hickman Palermo Becker Bingham LLP

(57) ABSTRACT

These techniques detect and compare amounts of motion of objects within video footage having sources of apparent motion. In an embodiment, for each frame of a video, a computer subtracts a background from the frame, converts the frame from grayscale to monochrome, and isolates regions of interest (ROIs) in the frame. For each frame, the computer identifies identifiable objects in the ROIs, selects selectable objects from the identifiable objects that have a percentage of motion that is within a particular range, and merges, into merged objects, subsets of the selectable objects that are separated by no more than a particular distance. Based on the merging, metadata is generated for any of: an object of the merged objects, the frame, or the video. The metadata may have a bounding rectangle, a bounding polygon, a frame timestamp, a frame identifier, or an object(s)'s identifier or percentage of motion.

20 Claims, 6 Drawing Sheets

(51) Int. Cl.
*G06T 7/194* (2017.01)
*H04N 19/167* (2014.01)
*H04N 19/46* (2014.01)
*G06T 7/254* (2017.01)
*H04N 19/85* (2014.01)
*H04N 19/543* (2014.01)

(52) U.S. Cl.
CPC .......... *H04N 19/167* (2014.11); *H04N 19/46* (2014.11); *H04N 19/543* (2014.11); *H04N 19/85* (2014.11); *G06T 2207/10016* (2013.01)

(56) References Cited

U.S. PATENT DOCUMENTS

| | | | |
|---|---|---|---|
| 8,416,993 B2 | 4/2013 | Springer et al. | |
| 9,158,975 B2 | 10/2015 | Lipton et al. | |
| 9,779,331 B2 | 10/2017 | Bulan et al. | |
| 2006/0245500 A1* | 11/2006 | Yonovitz | G01S 3/7865 375/240.19 |
| 2012/0069897 A1* | 3/2012 | Anselmo | H04N 19/124 375/240.03 |
| 2015/0310624 A1* | 10/2015 | Bulan | G06K 9/66 382/103 |
| 2016/0034499 A1* | 2/2016 | Maurer | G06F 16/258 707/809 |
| 2016/0045827 A1* | 2/2016 | Moya | A63F 13/60 345/582 |
| 2018/0253973 A1* | 9/2018 | Yang | G08G 1/166 |
| 2018/0276841 A1* | 9/2018 | Krishnaswamy | H04N 7/185 |

OTHER PUBLICATIONS

Yong et al., "Improved Gaussian Mixture Model in Video Motion Detection", Journal of Multimedia, vol. 8, No. 5, Oct. 2013, 7 pages.

Varcheie et al., "A Multiscale Region-Based Motion Detection and Background Subtraction Algorithm", Published online Jan. 28, 2010, MPDI, 21 pages.

* cited by examiner

FIG. 1

POST PROCESSING TO IMPROVE MOTION DETECTION RESULTS

CROSS-REFERENCE TO RELATED APPLICATION; BENEFIT CLAIM

This application claims the benefit of Provisional Appln. 62/566,063, filed Sep. 29, 2017, titled "Post Processing to Improve Motion Detection Results," the entire contents of which is hereby incorporated by reference as if fully set forth herein, under 35 U.S.C. § 119(e).

FIELD OF THE INVENTION

The present invention relates to object motion analysis for multimedia. Herein are efficient techniques for detecting and comparing relative amounts of motion of objects within video footage that has multiple sources of apparent motion.

BACKGROUND

There are many problems in computer vision related to light conditions, resolution and quality of the image, contrast, noise, or motion. To some extent, multimedia analytics software such as Oracle Big Data Spatial and Graph assists with general tasks such as video frame extraction or video decoding and some specialized tasks such as facial recognition. For example, Oracle Big Data Spatial and Graph includes the Open Source Computer Vision (OpenCV) open source libraries that provide some video analysis such as template-based object recognition and optical flow.

State of the art motion detection often provides results that are poor or meaningless for semantic analysis. Current software returns a binary result such as: a) there is motion, or b) there is no motion. If there is motion, current software may do little more than crop the video segment that contains motion and display the cropped segment to the user. The state of the art also succumbs to noise that may appear as motion. For example, every camera generates noise that reduces the accuracy or efficiency of object detection and motion analysis. Thus, there is a need for better post-capture preparation of video footage to increase the accuracy and/or efficiency of object recognition and object tracking.

BRIEF DESCRIPTION OF THE DRAWINGS

In the drawings:

FIG. 1 is a block diagram that depicts an example computer that detects and tracks moving objects in video footage;

DETAILED DESCRIPTION

Figure 2:
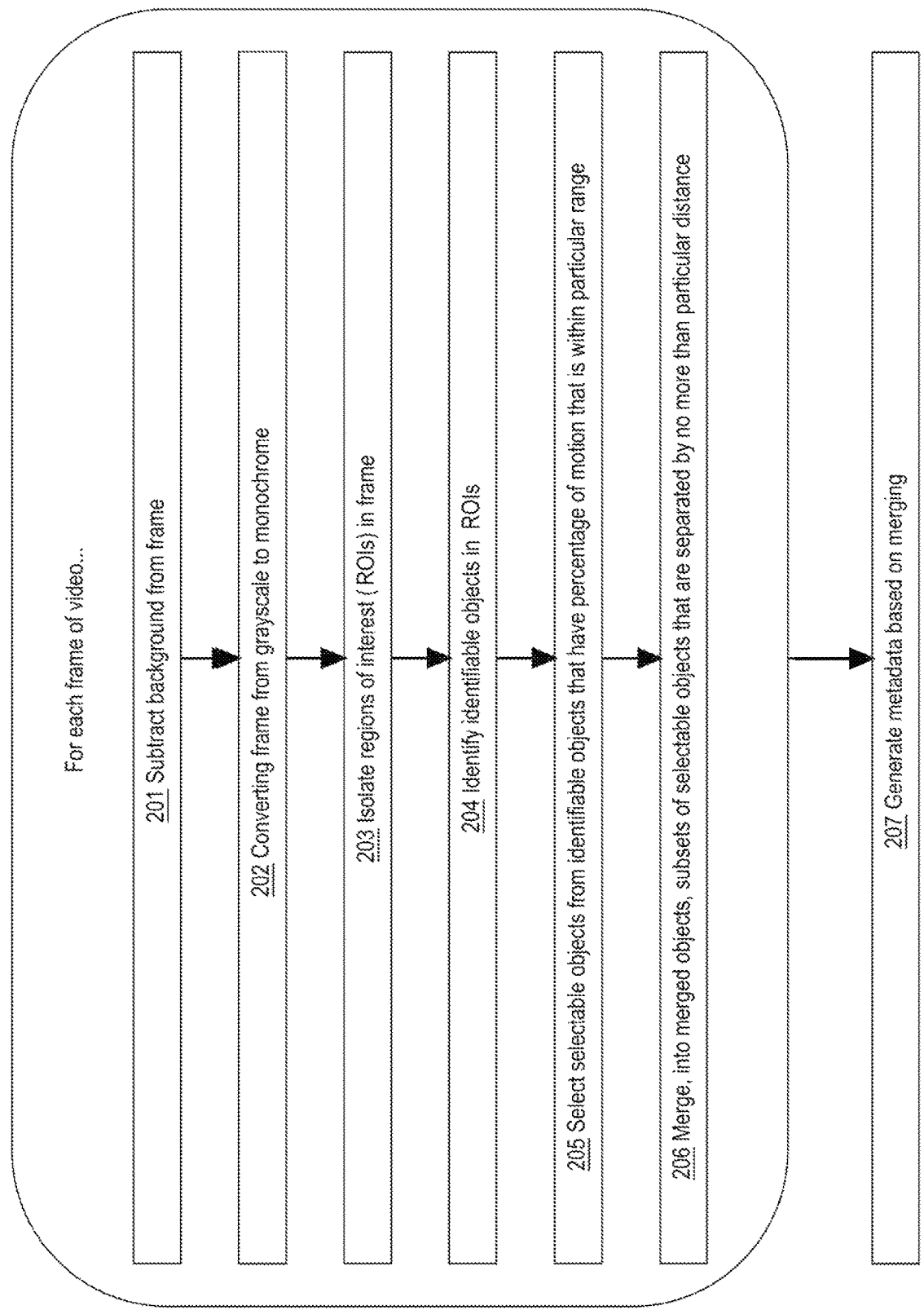
FIG. 2 is a flow diagram that depicts an example computer process that detects and tracks moving objects in video footage.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are computerized techniques for object motion analysis of video footage. Although existing algorithms typically only detect whether or not there is motion, techniques herein identify objects correctly by clustering, and return a percentage of motion at a specific time in a video. With these results, clients such as users and automation can decide whether or not the motion is meaningful to a specific application.

Included herein are various embodiments of motion detection post processing techniques that may use computationally intensive approaches such as:

Polygon masking with a geometry interchange format such as a geometry markup language such as Well Known Text (WKT);

Density Based Spatial Clustering of Applications with Noise (DBSCAN) with memoization; and/or Configuring motion detection filters.

In an embodiment, motion detection is computed with a Mixture of Gaussians (MoG) model that distinguishes a constant background of video frames from motion in a foreground. Some embodiments of MoG can subtract (i.e. erase) shadows. MoG emits grayscale images. For motion detection, binary images are required. After generating Gaussian results, an image is converted to a monochrome (black and white) image, with white pixels representing objects. In an embodiment, a configurable threshold indicates grayscale values that should be interpreted as black. Accelerated analysis is achieved by avoiding some computation, such as when pixel values below that threshold are not post processed for motion detection.

In an embodiment, (e.g. sequentially) for each frame of a video, a computer subtracts a background from the frame, converts the frame from grayscale to monochrome, and isolates regions of interest (ROIs) in the frame. For each frame, the computer identifies identifiable objects in the ROIs, selects selectable objects from the identifiable objects that have a percentage of motion that is within a particular range, and merges, into merged objects, subsets of the selectable objects that are separated by no more than a particular distance. Based on the merging, metadata is generated for at least one of: an object of the merged objects, the frame, or the video. The metadata may include any of: a bounding rectangle, a bounding polygon, a frame timestamp, a frame identifier, or a percentage of motion of at least one of the selectable objects and/or at least one of the merged objects.

The presented techniques may eventually perform object recognition and/or object tracking based on the generated metadata as discussed later herein or store the generated metadata to facilitate such analysis. Such analysis is accelerated due to reduced visual complexity as achieved by the extraction and filtration of the improved post-capture preparation of video footage as discussed herein. The reduced visual complexity achieved by these preparatory techniques cause object recognition and tracking to be more efficient and accurate. Increased efficiency is achieved by avoidance of processing irrelevant visual features such as noise. This efficiency may manifest as acceleration and/or energy saving for object recognition and tracking. Increased accuracy of object recognition and tracking will produce an analytic result (e.g. semantic analysis) that is more reliable and thus improved. Thus, the techniques herein can recognize and track objects faster than other techniques and with better accuracy.

1.0 Example Computer

Figure 1:
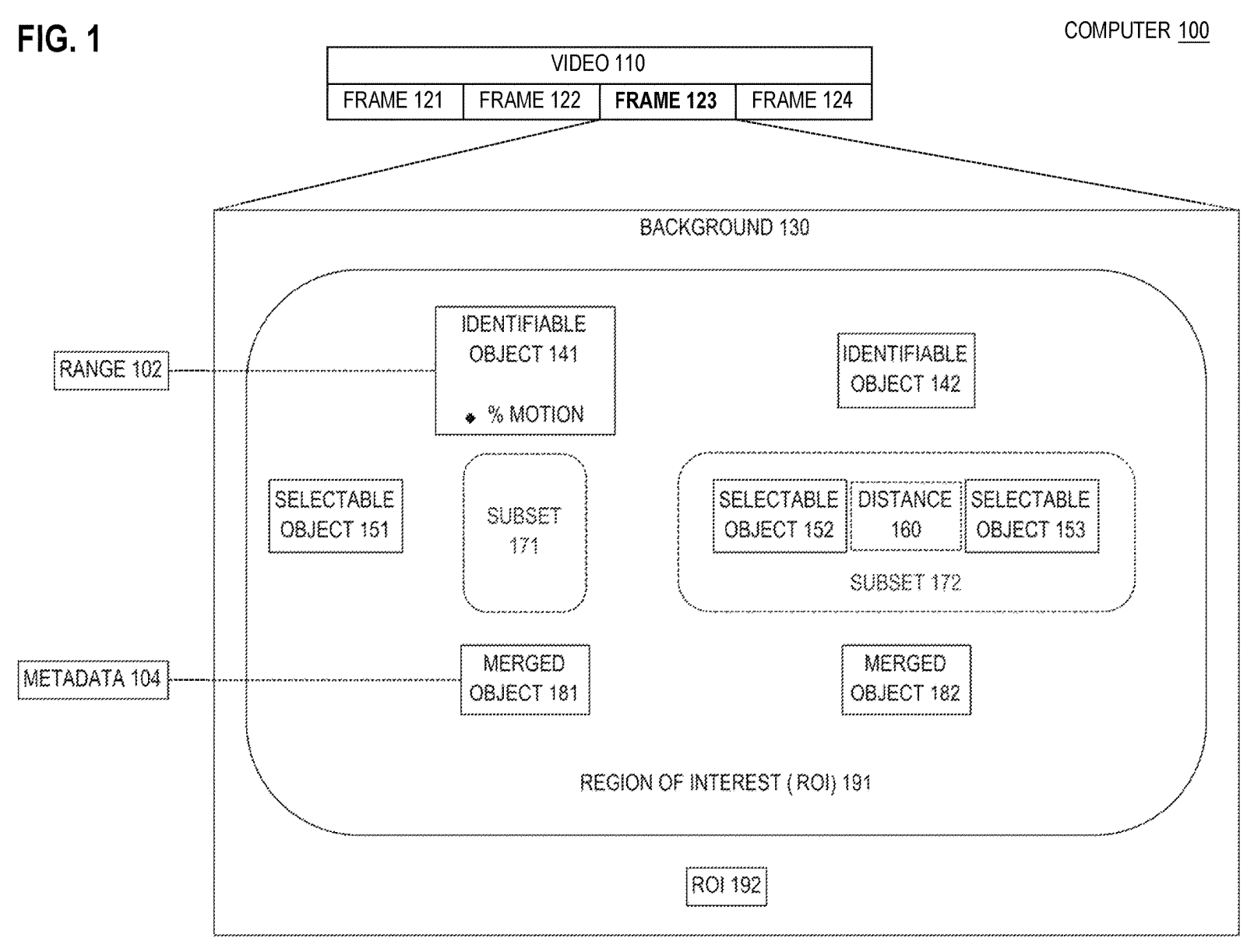

FIG. 1 is a block diagram that depicts an example computer 100, in an embodiment. Computer 100 detects and tracks moving objects in video footage. Computer 100 may be one or more of a rack server such as a blade, a personal computer, a mainframe, or other computing device.

Computer 100 may load and analyze video 110, such as recorded footage or a live stream, to detect which objects are interesting based on their motion. Video 110 may be digitized video such as a live stream (not shown) or footage that was previously recorded to a file (not shown). Based on factors such as a sampling rate and how video 110 is encoded, computer 100 may divide video 110 into discrete still images shown as frames 121-124. Motion may not be apparent in any one frame in isolation, but sequences of frames may reveal motion.

Each of frames 121-124 is a two dimensional image of a three dimensional scene that is primarily composed of uninteresting stationary content. For example, frame 123 has background 130 that computer 100 avoids analyzing while processing frame 123. Image analysis may entail geometric operations, such as polygon manipulation, including subtraction. As a preface to motion analysis, background 130 may be subtracted to avoid further processing. Avoidance of processing may manifest as savings of time and/or energy of computer 100 itself. Subtraction, masking, and compositional geometry are discussed later herein.

As described later herein, background subtraction may be based on motion detection. In an embodiment, frames 121-124 are analyzed as a sequence to detect stationary content, such as background 130, that may be subtracted to avoid further processing. For example, after background subtraction, only objects in motion and some visual noise may remain. Processing may be further conserved by designating regions of interest (ROIs) 191-192, with motion outside of ROIs 191-192 being ignored by the analytics. Each ROI 191-192 is applicable to all frames 121-124 of video 110. For example although ROIs 191-192 is shown in frame 123, other frames 121-122 and 124 also have same ROIs 191-192.

Preliminary processing, as described later herein, may convert frames 121-124 from raw grayscale to filtered monochrome. In an embodiment, objects in motion are converted to white, and uninteresting content (e.g. stationary, background, outside of ROI) is erased to black, thereby minimizing how much subsequent processing is needed to actually analyze motion after the motion is computationally detected. Computer 100 recognizes each collection of contiguous white pixels to be an identifiable object, such as 141-142.

When two collections of white pixels are near each other but not touching each other, they may (e.g. mistakenly) be recognized as two separate identifiable objects 141-142, even if the two collections are actually portions of a same single object. Each identifiable object 141-142 has a surface area, such as a bounding box or other bounding polygon, that is in motion, such that an identifiable object's position within each frame 121-124 changes from frame to frame, which computer 100 detects. The ratio of the object area to the area of the frame is referred to herein as the percent motion of the object. For example, if identifiable object 141 has twice the area of identifiable object 142, then 141's percent motion would be twice that of 142's percent motion.

Percent motion may be used as a filter to avoid further processing. Visual noise, due to inconsistent lighting or shortcomings of a camera, typically appears as sparkles, which are small noisy spots of changing brightness. As small spots, their area and percent motion is small. Small objects may be ignored according to a minimum percent motion threshold. Likewise, occasional camera movement may mistakenly register most or all of a frame as a monolithic moving object that is not amenable to meaningful analysis. Such a gross disturbance may be ignored according to a maximum percent motion threshold. Together, the minimum and maximum percent motion thresholds are shown as range 102. Identifiable objects whose percent motion satisfies range 102 are subjected to further processing as selectable objects 151-153 as follows. Identifiable objects that do not satisfy range 102 are erased (e.g. blacked out).

Neighboring apparent objects may actually be portions of the same actual object. Clustering is used to additively combine selectable objects into a merged object. So long as distances, such as 160, between objects, such as 152-153, do not exceed a threshold (not shown), then those objects 152-153 may be selected into subset 172 for consolidation into a merged object. For example, subsets 171-172 of selectable objects may each be consolidated into a merged object. Likewise, merged objects 181-182 are consolidations of selectable objects of other subsets. Adjacency, neighborhoods, and clustering are discussed later herein.

Ultimately, filtration and clustering results in frames 121-124 each retaining only merged objects 181-182 that are in motion. Then computer 100 may provide the resulting frames 121-124 and/or video 110 to a downstream subsystem (not shown) for (e.g. intensive) semantic analysis. To assist downstream analysis, computer 100 provides metadata 104 with resulting video 110. Metadata 104 may contain image and object statistics, as described later herein, that accelerate or otherwise facilitate semantic analysis.

2.0 Example Moving Object Detection Process

FIG. 2 is a flow diagram that depicts computer 100 as it detects and tracks moving objects in video footage, in an embodiment. FIG. 2 is discussed with reference to FIG. 1.

Steps 201-206 are repeated for each frame 121-124 in video 110. In an embodiment, only a current frame of 121-124 need simultaneously reside in random access memory (RAM) of computer 100. Thus, video 110 may be analyzed as a live stream or as archival footage.

Step 201 subtracts a background from the current frame. For example, background 130 of frame 123 is detected and erased (i.e. filled black). A mixture of Gaussians (MoG) algorithm, as discussed later herein, may be used for background subtraction. The result of step 201 is that the frame is encoded in greyscale, with the background and stationary content blackened such that the frame retains content in motion. Thus, step 201 achieves significant filtration, which will save time and energy of computer 100 itself during subsequent steps of FIG. 2.

Step 202 converts the frame from grayscale to monochrome, thereby achieving a binary image that is efficient for motion analysis. As discussed later herein, a monochrome enhances contrast, such as edges of objects. Also as explained later herein, Otsu thresholding may be used to convert from grayscale to monochrome. The result of step 202 is a significantly distilled binary image that has a very high signal to noise ratio and that encodes moving objects as more or less visually opaque. Thus, step 202 achieves significant filtration which will save time and energy of computer 100 itself during subsequent steps of FIG. 2.

Step 203 isolates regions of interest (ROIs) in the frame. As explained later herein, geometric masks may be used to specify portions of frames that may or may not be interesting and should or should not be analyzed further. For example, ROI 191-192 may act as viewports that limit computer 100 to fully analyzing less than all of the area of frames 121-124. Thus, step 203 achieves significant filtration which will save time and energy of computer 100 itself during subsequent steps of FIG. 2. Masks and geometry are discussed later herein.

Step 204 identifies identifiable objects in the ROIs. As discussed later herein, computer 100 may use connected component analysis (CCA) to detect objects. CCA is discussed later herein. The result of step 204 need not be visually evident in the frame because step 204 primarily generates metadata that may contribute to metadata 104. For example, step 204 may assign separate object labels to identifiable objects 141-142, such that labels are a form of metadata. As explained later herein, labels and other metadata increase the semantic content of frames 121-124 without disturbing the content itself. Thus, step 204 achieves semantic enrichment instead of filtration. In an embodiment, object detection may be decoupled from object labeling. In an embodiment, labeling is deferred until step 206 below because it is more efficient to only label interesting objects.

Step 205 selects selectable objects from the identifiable objects that have a percentage of motion that is within a particular range. As explained later herein, percent motion measures how much of a frame is disturbed by motion of a given object, which can be used to detect whether or not the object is interesting (e.g. for further analysis). Objects having an aberrant percent motion are uninteresting and can be erased (i.e. blackened). Thus, step 205 achieves significant filtration which will save time and energy of computer 100 itself during subsequent steps of FIG. 2 because less content will need processing. Interesting objects such as selectable objects 151-153 are retained for further analysis.

Step 206 merges, into merged objects, subsets of selectable objects that are separated by no more than a particular distance. Step 206 may combine smaller objects into larger objects in various ways, depending on the embodiment. As explained later herein, step 206 may perform cluster analysis to combine objects based on neighborhood density. For example, selectable objects 152-153 of subset 172 may be apparently separated by a visually fuzzy (i.e. noisy) gap that may be statistically insignificant such that the gap may be disregarded as not actually separating objects 152-153. For example, density and neighborhood based clustering are discussed later herein. Thus merged objects, such as 181-182, may emerge. Even when selectable objects, such as 152-153, are clearly separated by distance 160, but only slightly, then step 206 may combine them into a merged object. For example, merging may occur if distance 160 does not exceed a threshold. Step 206 labels at least merged objects 181-182 and may also temporarily label objects that are subsequently replaced by merging in this step. Labeling involves producing metadata without necessarily disturbing the visual content of the frame. Thus, step 206 achieves semantic enrichment instead of filtration.

Step 207 generates metadata based on merged objects. Merged objects 181-182 and metadata are a payload for use as input to downstream semantic analysis (not shown). Metadata 104 may contain object labels, as well as statistics about important subjects such as merged objects 181-182, frames 121-124, or video 110 as a whole. Metadata 104 may also include any of: a bounding rectangle, a bounding polygon, a frame timestamp, a frame identifier, or a percentage of motion of at least one of the one or more selectable objects and/or at least one of the one or more merged objects.

In an embodiment, computer 100 stores metadata 104 for later use by an object analysis computer such as computer 100 or another computer. In an embodiment, the object analysis computer performs object recognition of merged objects 181-182 based on metadata 104. Object recognition entails classifying (a.k.a. labeling) merged objects 181-182 as particular (e.g. expected) object types, perhaps based on visual appearance, movement, or position. For example, a door or a person may have an expected amount or percentage of motion that matches merged object 181 according to metadata 104. Object recognition is accelerated due to reduced visual complexity as achieved by the extraction and filtration that computer 100 performs as described herein before or during the generation of metadata 104.

In an embodiment, the object analysis computer performs object tracking of merged objects 181-182 based on metadata 104. Object tracking may be based on object recognition. Object tracking may confirm (e.g. based on trajectory and positional history) an object recognition of merged object 181 based on percentage of motion of object 181 per metadata 104. In an embodiment, the object analysis computer predicts a future location of merged object 181 based on metadata 104. In an embodiment, the object analysis computer detects and/or alerts a disappearance or first appearance of merged object 181. Object tracking is accelerated due to reduced visual complexity as achieved by the extraction and filtration that computer 100 performs as described herein before or during the generation of metadata 104.

3.0 Filtration and Object Detection

Figure 3:
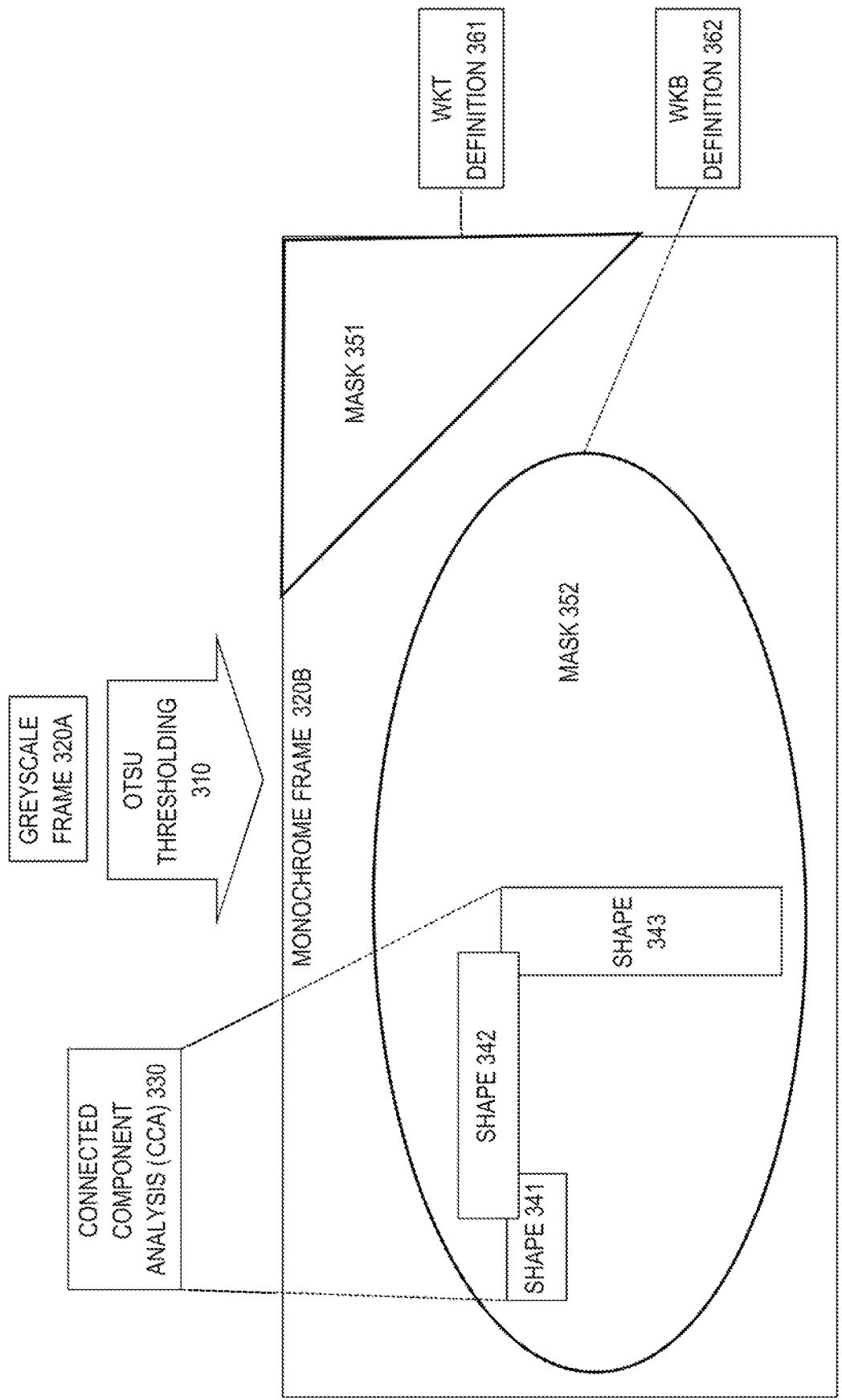
FIG. 3 is a block diagram that depicts an example computer that detects and filters raw objects in video footage as a preface to object clustering.

FIG. 3 is a block diagram that depicts an example computer 300, in an embodiment. Computer 300 detects and filters raw objects in video footage as a preface to object clustering. Computer 300 may be an implementation of computer 100. FIG. 3 shows processing of a single frame 320 of a video.

Initially, the frame is encoded as raw greyscale, shown as 320A, either as originally recorded or after conversion from a full color original. Computer 300 converts greyscale frame 320A into monochrome (i.e. black and white) frame 320B. Conversion to monochrome based on motion across multiple frames ensures that monochrome frame 320B contains only objects in motion (and noise if not yet filtered). In an embodiment, Otsu thresholding 310 is used to convert from greyscale to monochrome. Otsu thresholding 310 can erase background and enhance contrast. Otsu thresholding 310 detects a background shade and a foreground shade within greyscale frame 320A by itself (i.e. ignores other frames) and uses those two shades to build a bimodal histogram of pixels of greyscale frame 320A. Otsu thresholding 310 is optimized for identifying a threshold intensity (i.e. shade) that can be used to distinguish foreground pixels from background pixels such that overall contrast of entire monochrome frame 320B is maximized, which is a computationally intensive optimization problem.

Geometric operations such as clipping and masking, such as with mask 351-352, may occur while processing monochrome frame 320B as shown or while processing greyscale frame 320A. Masks may have a polarity that either includes or excludes content. For example, mask 351 may erase (i.e. exclude from further processing) a portion of the frame. Whereas, mask 352 may be a clipping viewport such that content outside of the mask is ignored (i.e. erased). Masks of the same polarity may be additively combined by adjacency or overlap to form a combined mask (not shown) that has a complicated perimeter. Masks of opposite polarity may be combined by subtraction to create a combined mask that has a complicated interior, such as a donut shape (i.e. two dimensional torus). Masking may be implemented as follows.

Although masks 351-352 are shown in monochrome frame 320B, the following masking discussion regards applying masks to greyscale frame 320A before Otsu thresholding 310. In order to eliminate most noise, a mask represented by polygons is applied over greyscale frame 320A to prevent noise from being automatically interpreted as motion. In an embodiment, Well Known Text (WKT) may be used to build a mask by encoding a polygon to cover the image. WKT encoding of geometry values is designed as an interchange (i.e. externalization) format for exchanging geometry data in ASCII form. The OpenGIS specification provides a Backus-Naur grammar that specifies the formal production rules for writing WKT values. Well-Known Binary (WKB) representation of geometric values may be used for exchanging geometry data as binary streams represented by BLOB values containing geometric WKB information. The WKB format is defined by the OpenGIS specification and in the ISO SQL/MM Part 3: Spatial standard. Masking is also useful to monitor only a specific region of a scene. Depending on the mask type, everything inside or outside the masked area may be ignored.

For example, an inclusion mask placed on a door may indicate that only motion at the door should be detected, such as opening, closing, or a person passing through. In another example, an exclusion mask placed on a window may indicate that if someone walks by the window, or if tree movement is reflected in the window, these movements should not be detected as motion. After applying an inclusive mask, only motion in the region of interest (ROI) indicated by the mask should be detected. Most use cases are covered by three types of masks, which are polygons, windows, and composites as follows.

A mask that is an individual polygon may be inner filled (i.e. the inside of the polygon will be erased) to cover specific regions of the scene. To create these isolated polygons, the polygons are individually specified, with one polygon per line of text in a WKT file. For example, WKT definition 361 may be such a line of text that defines the polygon(s) of mask 351. If a WKB file is involved instead of a WKT file, then WKB definition 362 may define the polygon(s) of mask 352. For example, a WKT definition of an inner filled polygon mask may be:
POLYGON ((119.0 796.0, 917.0 795.0, 917.0 1024.0, 119.0 1025.0, 119.0 796.0))

A mask that has one window polygon may be outer filled such that the outside of the polygon will be erased (not including other window masks), and only objects on the inside of the polygon will be considered for motion detection. The WKT file for a one window polygon must contain a single line describing the polygon, with its coordinates repeated. For example:
POLYGON ((4.0 387.0, 359.0 363.0, 357.0 290.0, 4.0 288.0, 4.0 387.0),
(4.0 387.0, 359.0 363.0, 357.0 290.0, 4.0 288.0, 4.0 387.0))

Subtractive composition of masks, such as an inner-filled polygon within an outer-filled polygon may be specified as with the coordinates of the outer-filled polygon repeated and followed by the coordinates of the inner-filled polygon. For example, an hexagon may be nested in a rectangular window, with the last line of text defining the hexagon:
POLYGON ((971.0 528.0, 1625.0 544.0, 1617.0 29.0, 952.0 14.0, 971.0 528.0),
(971.0 528.0, 1625.0 544.0, 1617.0 29.0, 952.0 14.0, 971.0 528.0),
(1203.0 382.0, 1276.0 342.0, 1361.0 361.0, 1370.0 451.0, 1324.0 504.0, 1220.0 485.0, 1203.0 382.0))

Merging objects by clustering occurs after the processing shown in FIG. 3. However, clustering is preceded by initial detection of raw objects, as shown in FIG. 3. An object may have a complicated shape that is composed of pieces that actually touch each other. Thus in monochrome frame 320B, an object is a maximal collection of connected white pixels. For example, various corners and edges make up shapes 341-343 that are connected. Connected component analysis (CCA) 330 detects each maximal extent of connected white pixels to detect an object. In an embodiment, a respective bounding box or a bounding polygon is used as a proxy for each extent of connected white pixels, such that a connection is detected if two bounding boxes or polygons touch each other. For example, CCA 330 detects that bounding boxes 341-343 are actually connected as one object, even if the white pixels of box 341 do not actually touch any white pixels of boxes 342-343. Example CCA algorithms include Hoshen-Kopelman and watershed segmentation. The OpenCV library includes a CCA implementation that computer 300 may use.

4.0 Clustering and Merging

Figure 4:
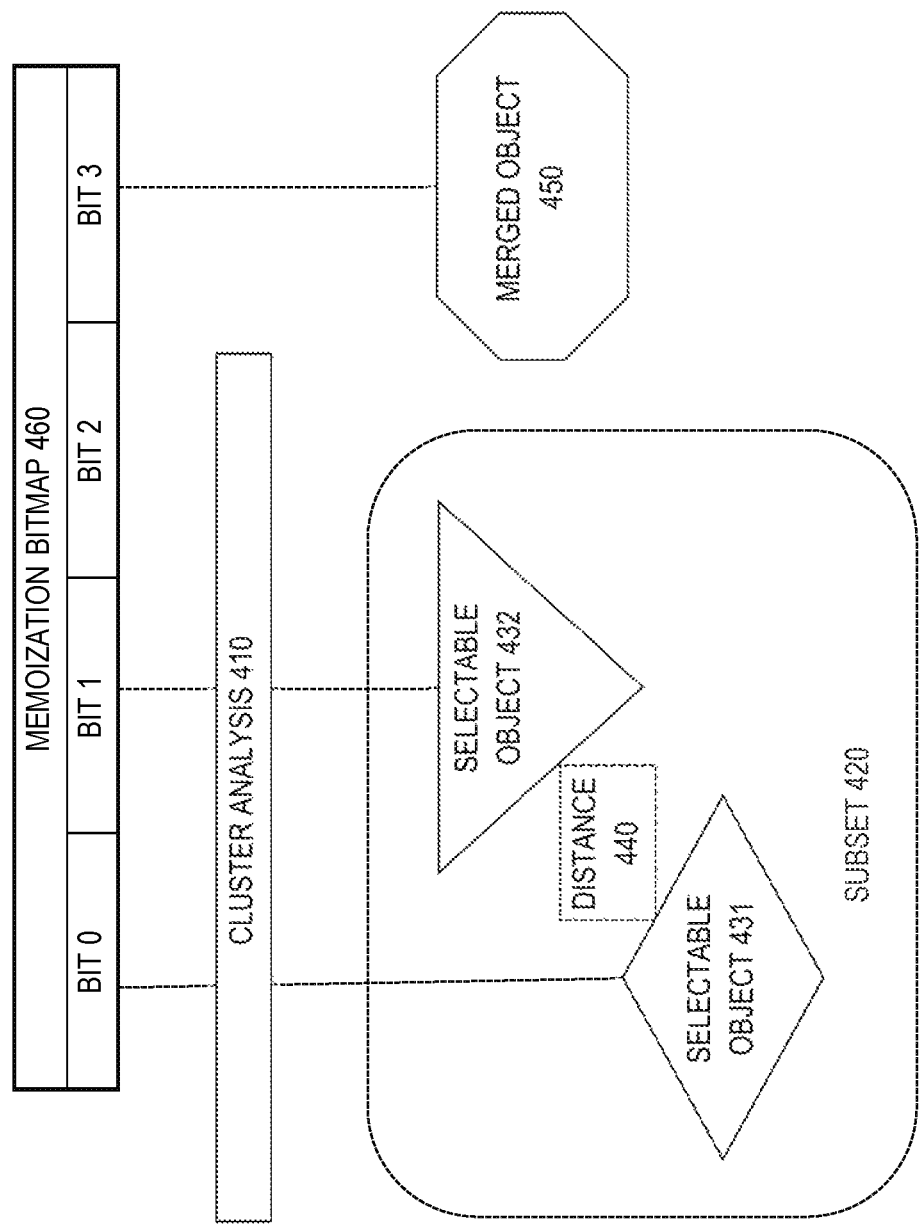
FIG. 4 is a block diagram that depicts a computer that clusters apparently separate objects into a merged object.

FIG. 4 is a block diagram that depicts an example computer 400, in an embodiment. Computer 400 clusters apparently separate objects into a merged object. Computer 400 may be an implementation of computer 100.

After object detection is performed, there may be many objects of different sizes in a frame. These objects are represented by white pixels in a monochrome image that may still have noise. Post processing may be needed to clean the image and cluster the objects according to cluster analysis 410. In an embodiment, the Density Based Spatial Clustering of Applications with Noise (DBSCAN) algorithm implements cluster analysis 410. Locality-based clustering algorithms group neighboring data objects into clusters based on local conditions. These algorithms allow clustering to be performed in one scan of the data set. DBSCAN is a typical representative of this group of algorithms that includes other algorithms such as hierarchical, centroid, distribution, or density based clustering. Cluster analysis 410 may use a clustering algorithm provided by OpenCV or TensorFlow open source libraries.

DBSCAN regards clusters as dense regions, such as subset 420, of objects 431-432 in the input space that are separated by regions of low density. DBSCAN is designed to detect that the density of points in a radius around each point in a cluster exceeds a density threshold. DBSCAN may grow a cluster so long as, for each data point within the cluster, a neighborhood of a given radius contains at least a minimum number of white pixels. DBSCAN has computational complexity $O(n2)$. If a spatial index is used, the computational complexity is $O(n \log n)$. In an embodiment, the spatial index imposes a rectangular grid upon a frame and uses an identifier of each grid cell as a lookup key for more or less co-located objects.

DBSCAN has two clustering modes (e.g. phases). A first mode is density based as already discussed. A second mode coalesces neighboring clusters into a combined cluster. For example, distance 440 that separates selectable objects 431-342 may be devoid of white pixels such that the pixel density within distance 440 is insufficient to grow selectable object 431 to reach selectable object 432 and vice versa. Thus based solely on density, selectable objects 431-432 are separate. However if distance 440 is less than a distance threshold, then DBSCAN may merge selectable objects 431-432 into one merged object. For example, merged object 450 may be a consolidation of multiple neighboring objects. In various embodiments, distance between two objects is measured based on: a) distance between the centroids of the objects, b) distance between two objects is measured based on the gap between the two closest respective edges of the two objects, or c) either distance, depending on a configuration switch. For example, distance 440 is shown as a rectangle whose perimeter touches respective edges of selectable objects 431-432. Thus, distance between objects 431-432 may be the length of the diagonal of the rectangle of distance 440.

Distance calculations may be more or less expensive. For example, centroid calculation is expensive. Density and neighborhood calculations may be even more expensive. Furthermore, such calculations for a given object may be repeatedly needed during DBSCAN of an individual frame, even though the results of the calculations seldom change (except when an object grows as a cluster, or a merged object replaces separate objects) and/or may be only slightly changed during animation across multiple frames. Thus, DBSCAN is naturally prone to redundant calculations, which is wasteful.

An embodiment may use a structural design pattern, referred to herein as memoization, to avoid redundant calculation, thereby saving time and energy of computer 400 itself. For example, computer 400 may have an associative table (not shown), such as a hash map, that maps permutations of input values for a redundant calculation to expensive results previously calculated for those permutations. For example, an identity of an object may be mapped to a centroid or a neighborhood, and a bounding box may be mapped to a density. Thus, DBSCAN may reuse mapped results without accruing additional computational cost, and an initial cost may be amortized across repeated reuses.

Further acceleration may be achieved by expressly tracking which objects do or do not yet have reusable results. Memoization bitmap 460 may have a respective bit, such as 0-3, for each object that may have a same kind of result already calculated. For example, bitmap 460 may indicate which objects (or which points or quadrants) have already calculated neighborhoods or densities. For example, bit 0 indicates availability or not of a neighborhood that surrounds object 431. If bit 0 is set, then computer 400 may access a cache (not shown) to retrieve the reusable neighborhood.

An example DB SCAN algorithm may be:

```
DBSCAN (D, eps, MinPts)
  C = 0 for each unvisited point P in dataset D mark P as visited
  NeighborPts = regionQuery(P, eps)
  if sizeof(NeighborPts) < MinPts mark P as NOISE
  else C = next cluster
  expandCluster(P, NeighborPts, C, eps, MinPts) add P to cluster C
  for each point P' in NeighborPts
    if P' is not visited mark P' as visited
    NeighborPts' = regionQuery(P', eps)
    if sizeof(NeighborPts') >= MinPts
      then NeighborPts = NeighborPts joined with NeighborPts'
    if P' is not yet member of any cluster add P' to cluster C
    regionQuery(P, cps)
    return all points within P's eps-neighborhood (including P)
```

In the above pseudocode, DB SCAN's arguments include:
MinPts: threshold for ignoring a tiny cluster having too few lit points
eps: The epsilon neighborhood distance threshold for fusing two clusters that almost touch each other into one combined cluster The above regionQuery method invocation may take a long time to detect candidate objects, since image processing can be expensive. For motion detection, memoization (retention of prior results for subsequent reuse) is added to the algorithm in order to reduce the CPU time required. This is done by passing to each function call a Boolean vector of state flags, such as bitmap 460. Each state flag in the vector indicates whether a particular element was already processed. If so, processing will skip this element and continue on to the next element, thereby reducing CPU consumption of time and energy.

5.0 Java Embodiment

A Java embodiment of the above techniques may operate in example steps 1-11 of phases A-F as follows. The following steps 1-2 may correspond to step 201 of FIG. 2. Step 3 may correspond to step 202. Steps 4-5 may correspond to step 203. Step 6 may correspond to step 204. Steps 7-8 may correspond to step 205. Steps 9-10 may correspond to step 206. Step 11 may correspond to step 207.

A. MoG instance
  1. Create an instance of org.opencv.video.BackgroundSubtractorMOG2.
B. Binary Image
  2. Use apply method of the MOG instance with the current frame in memory. A normalized learning rate (speed to change distribution's parameters) of 0.2 is effective.
  3. Convert the grayscale image (Gaussian result) to a binary image using the Otsu threshold method with a value close to 100% for high contrast and edge detection.
C. Masking
  4. Create the mask representation by reading the WKT using oracle.spatial.util.WKT and oracle.spatial.geometry.JGeometry. Oracle Big Data Spatial and Graph provides support for parsing WKT.
  5. Apply the mask to the result of step 3 so only region of interest (ROI) results are considered.
D. Percentage Filtering
  6. Create a bounding rectangle for each object.
  7. Compute the percentage of motion that every object represents.
  8. Filter the objects by minimum and maximum parameters.
E. Clustering
  9. Label the objects that remain after filtering using the clustering algorithm.
  10. Merge objects by label groups and create the equivalent bounding rectangle for each cluster.
F. Results
  11. Output resulting objects into the desired format. Results usually contain the position of the bounding rectangle, the timestamp, and the percentage of motion that the object represents.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
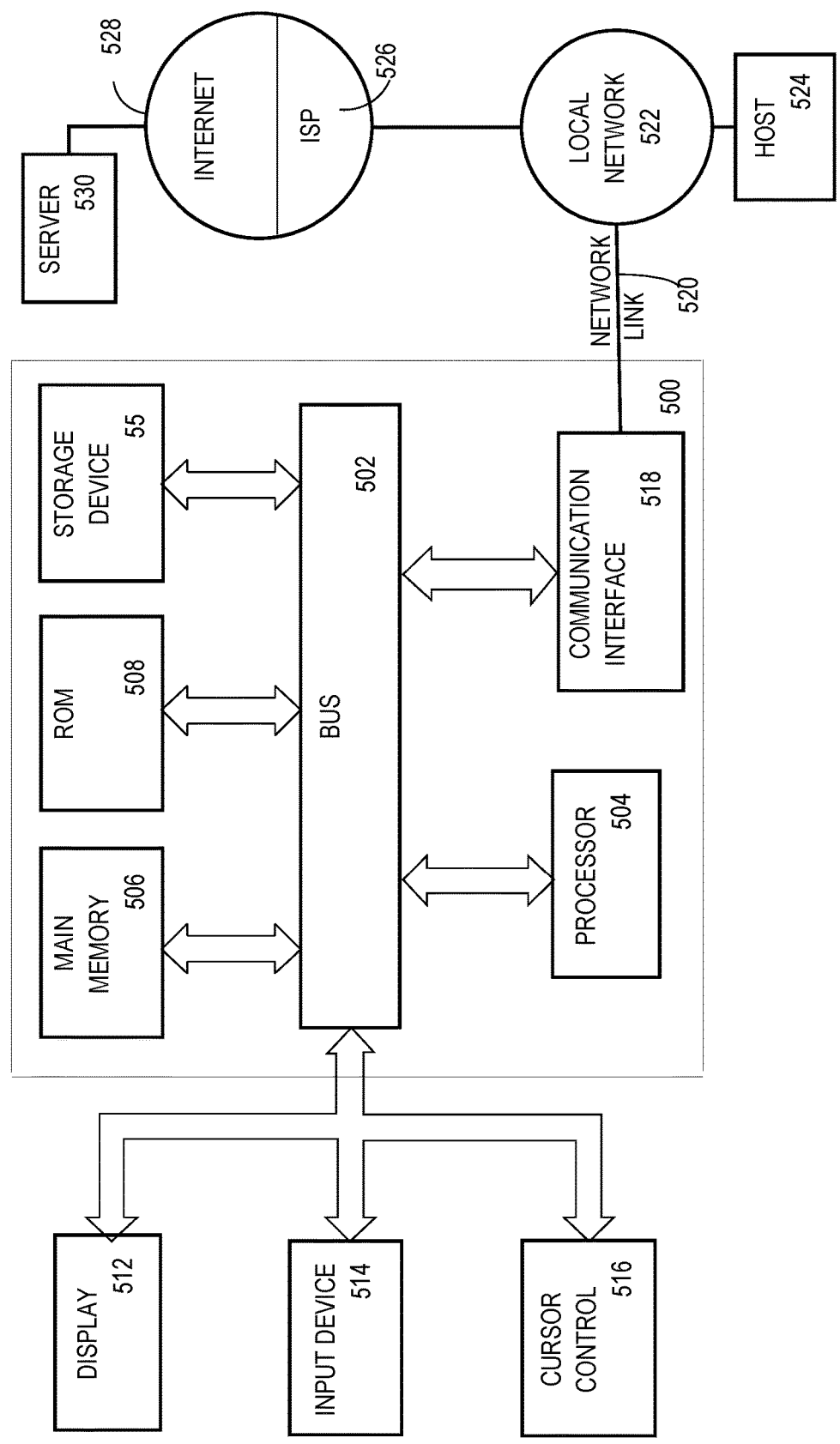
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 55, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 55. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 55. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 55 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 55, or other non-volatile storage for later execution.

Software Overview

Figure 6:
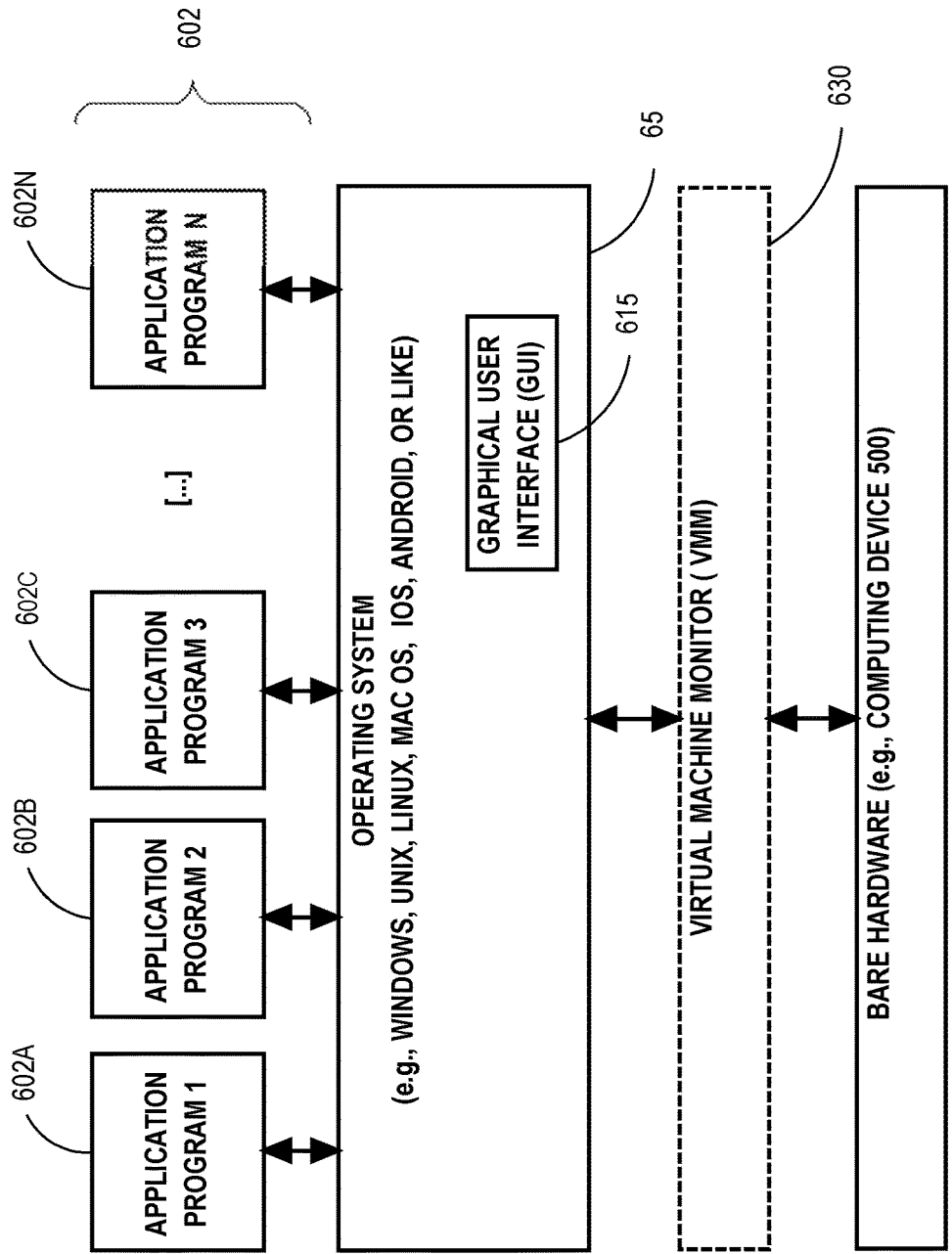
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 56, includes a kernel or operating system (OS) 65.

The OS 65 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 56 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 65 and/or application(s) 602. The GUI 615 also serves to display the results of operation from the OS 65 and application(s) 602, whereupon the user may supply additional inputs or terminate the session (e.g., log off).

OS 65 can execute directly on the bare hardware 620 (e.g., processor(s) 504) of computer system 500. Alternatively, a hypervisor or virtual machine monitor (VMM) 630 may be interposed between the bare hardware 620 and the OS 65. In this configuration, VMM 630 acts as a software "cushion" or virtualization layer between the OS 65 and the bare hardware 620 of the computer system 500.

VMM 630 instantiates and runs one or more virtual machine instances ("guest machines"). Each guest machine comprises a "guest" operating system, such as OS 65, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 600 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
a) for each frame of a video:
subtracting a background from the frame;
converting the frame from grayscale to monochrome;
isolating one or more regions of interest (ROIs) in the frame;
identifying one or more identifiable objects in the one or more ROIs;
selecting one or more selectable objects from the one or more identifiable objects that have a percentage of motion that is within a particular range; and
merging, into one or more merged objects, one or more subsets of the one or more selectable objects that are separated by no more than a particular distance;
b) generating, based on the merging, metadata for at least one of: an object of the one or more merged objects, the frame, or the video;
c) using, or storing for such use, said metadata to perform object recognition or object tracking of at least one of said one or more merged objects.

2. The method of claim 1 wherein:
the method further comprises creating one or more image masks for the video;
isolating the one or more ROIs comprises applying the one or more image masks to the frame.

3. The method of claim 2 wherein creating one or more image masks comprises processing definitions of the one or more image masks of at least one format of: a geometry markup language, well known text (WKT), or well known binary (WKB).

4. The method of claim 1 wherein subtracting the background comprises at least one of: a) applying a mixture of Gaussians (MoG), or b) subtracting shadows.

5. The method of claim 1 wherein converting from grayscale to monochrome comprises applying Otsu thresholding.

6. The method of claim 1 wherein identifying the one or more identifiable objects comprises performing connected-component analysis (CCA).

7. The method of claim 1 wherein merging the one or more subsets comprises cluster analysis.

8. The method of claim 7 wherein the cluster analysis comprises density based spatial clustering of applications with noise (DBSCAN).

9. The method of claim 8 wherein applying DBSCAN comprises at least one of: a) memoization, or b) detecting a distance between adjacent edges of two objects of the one or more selectable objects.

10. The method of claim 9 wherein memoization comprises associating a respective bit with each object of said one or more merged objects and/or each object of said one or more selectable objects.

11. The method of claim 1 wherein said metadata comprises at least one of: a bounding rectangle, a bounding polygon, a frame timestamp, a frame identifier, or a percentage of motion of at least one of the one or more selectable objects and/or at least one of the one or more merged objects.

12. One or more computer-readable non-transitory media storing instruction that, when executed by one or more processors, cause:
a) for each frame of a video:
subtracting a background from the frame;
converting the frame from grayscale to monochrome;
isolating one or more regions of interest (ROIs) in the frame;
identifying one or more identifiable objects in the one or more ROIs;
selecting one or more selectable objects from the one or more identifiable objects that have a percentage of motion that is within a particular range; and
merging, into one or more merged objects, one or more subsets of the one or more selectable objects that are separated by no more than a particular distance;
b) generating, based on the merging, metadata for at least one of: an object of the one or more merged objects, the frame, or the video;
c) using, or storing for such use, said metadata to perform object recognition or object tracking of at least one of said one or more merged objects.

13. The one or more computer-readable non-transitory media of claim 12 wherein:
the instructions further cause creating one or more image masks for the video;
isolating the one or more ROIs comprises applying the one or more image masks to the frame.

14. The one or more computer-readable non-transitory media of claim 12 wherein subtracting the background comprises at least one of: a) applying a mixture of Gaussians (MoG), or b) subtracting shadows.

15. The one or more computer-readable non-transitory media of claim 12 wherein identifying the one or more identifiable objects comprises performing connected-component analysis (CCA).

16. The one or more computer-readable non-transitory media of claim 12 wherein merging the one or more subsets comprises cluster analysis.

17. The one or more computer-readable non-transitory media of claim 16 wherein the cluster analysis comprises density based spatial clustering of applications with noise (DBSCAN).

18. The one or more computer-readable non-transitory media of claim 17 wherein applying DBSCAN comprises at least one of: a) memoization, or b) detecting a distance between adjacent edges of two objects of the one or more selectable objects.

19. The one or more computer-readable non-transitory media of claim 18 wherein memoization comprises associating a respective bit with each object of said one or more merged objects and/or each object of said one or more selectable objects.

20. The one or more computer-readable non-transitory media of claim 12 wherein said metadata comprises at least one of: a bounding rectangle, a bounding polygon, a frame timestamp, a frame identifier, or a percentage of motion of at least one of the one or more selectable objects and/or at least one of the one or more merged objects.

\* \* \* \* \*